United States Patent [19]
Huber

[11] Patent Number: 5,140,456
[45] Date of Patent: Aug. 18, 1992

[54] LOW NOISE HIGH POWER OPTICAL FIBER AMPLIFIER

[75] Inventor: David R. Huber, Warrington, Pa.

[73] Assignee: General Instrument Corporation, Hatboro, Pa.

[21] Appl. No.: 681,986

[22] Filed: Apr. 8, 1991

[51] Int. Cl.$^5$ .......................... H01S 3/094; G02B 6/26
[52] U.S. Cl. ........................................ 359/341; 372/6; 372/70
[58] Field of Search ...................... 330/4.3; 372/6, 70, 372/71, 75; 350/96.13; 455/610; 359/341

[56] References Cited

U.S. PATENT DOCUMENTS

| | | | |
|---|---|---|---|
| 3,590,004 | 6/1971 | Woodland | 330/4.3 |
| 3,760,292 | 9/1973 | Kogelnik et al. | 330/4.3 |
| 3,786,365 | 1/1974 | Robinson et al. | 330/4.3 |
| 4,554,510 | 11/1985 | Shaw et al. | 330/4.3 |
| 4,589,118 | 5/1986 | Suzuki et al. | 372/71 |
| 4,794,615 | 12/1988 | Berger et al. | 372/71 |
| 4,807,240 | 2/1989 | Goldstone | 372/70 |
| 4,859,016 | 8/1989 | Shaw et al. | 330/4.3 |
| 4,964,131 | 10/1990 | Liu et al. | 372/6 |
| 5,005,115 | 4/1991 | Desurvire et al. | 330/4.3 |

OTHER PUBLICATIONS

Laning et al, "Optimal Pumping of Erbium Doped Fiber Optical Amplifiers"; ECOC 88, Publ. No. 292, IEE, pp. 25-28, vol. 2, 1988.

Desurvire, E., "Analysis of Noise . . . Near 980 and 140 nm"; Appl. Opt., vol. 29, #21, pp. 3118-3125, Jul. 20, 1990; abstract only supplied.

Suzuki et al; "High Power Er$^{3+}$ doped Fiber Amplifier . . . "; Jpn. J. Appl. Phys. 2, Lett. (Japan), vol. 29, #11, pp. L2067-L2069, Nov. 1990 abst only supplied.

Sugawa et al; "10 dB Gain . . . Fibre Amplifier"; Electron. Lett., vol. 26, #24, pp. 2042-2044, Nov. 22, 1990, abst only provided.

Aoki et al; "Efficient Backward and Forward . . . Fibres"; Electron. Lett., vol. 19, #16, pp. 620-622, Aug. 4, 1983; abst only provided.

Primary Examiner—Nelson Moskowitz
Attorney, Agent, or Firm—Barry R. Lipsitz

[57] ABSTRACT

A rare earth doped optical fiber amplifier is pumped at a first wavelength selected to provide a low noise figure, and at a second wavelength selected to provide a high power efficiency. An erbium-doped fiber amplifier is illustrated, in which the first wavelength is about 980 nm and the second wavelength is about 1480 nm. The amplifier is forward pumped with the 980 nm wavelength adjacent the amplifier input to provide a low noise figure. Backward pumping at the 1480 nm wavelength is provided adjacent the amplifier output to achieve a high power efficiency.

16 Claims, 1 Drawing Sheet

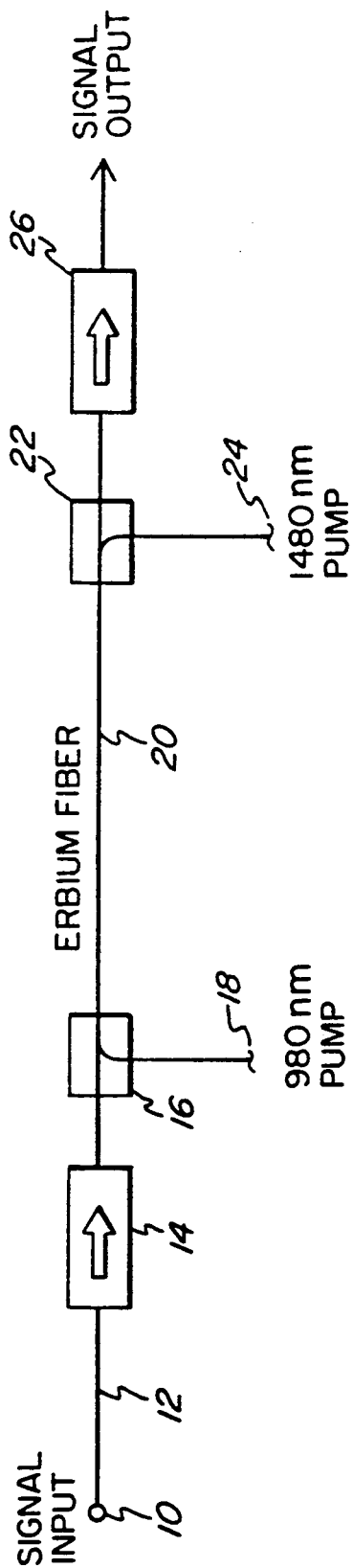

LOW NOISE HIGH POWER OPTICAL FIBER AMPLIFIER

BACKGROUND OF THE INVENTION

The present invention relates to optical fiber communication systems, and more particularly to an improved rare earth-doped optical fiber amplifier.

Cable television systems currently distribute television program signals via coaxial cable, typically arranged in tree and branch networks. Coaxial cable distribution systems require a large number of high bandwidth electrical amplifiers. For example, forty or so amplifiers may be required between the cable system headend and an individual subscriber's home.

The use of a television signal comprising amplitude modulated vestigial sideband video subcarriers (AM-VSB) is preferred in the distribution of cable television signals due to the compatibility of that format with the standards of the National Television Systems Committee (NTSC) and the ability to provide an increased number of channels within a given bandwidth. An undesirable characteristic of AM-VSB transmission, however, is that it requires a much higher carrier-to-noise ratio (CNR) than other techniques, such as frequency modulation or digital transmission of video signals. Generally, a CNR of at least 40 dB is necessary to provide clear reception of AM-VSB television signals.

The replacement of coaxial cable with optical fiber transmission lines in television distribution systems has become a high priority. Production single mode fiber can support virtually unlimited bandwidth and has low attenuation. Accordingly, a fiber optic distribution system or a fiber-coax cable hybrid would provide substantially increased performance at a competitive cost as compared to prior art coaxial cable systems.

Amplification of optical signals within an optical fiber network has been a problem in the attempt to distribute AM-VSB television signals. As noted above, amplifiers are required between a cable system headend and a subscriber's home in order to provide signals to the subscriber at an acceptable power level. Semiconductor optical amplifiers of the type typically used in fiber optic systems produce high levels of distortion products that are not compatible with multi-channel AM-VSB video signals. This is due to the short lifetime of the carrier excited state within the semiconductor optical amplifier. The recombination time of such an amplifier operating near 1.3 $\mu$m or 1.5 $\mu$m is about 1.2 nanoseconds, which is short compared to the period of typical AM-VSB subcarrier operating in the television band of about 55.25 MHz to 1 GHz.

Optical fiber amplifiers, such as erbium-doped fiber amplifiers, have been proposed for applications in long distance transmission and subscriber loop distribution systems. See, e.g., W. I. Way, et al, "Noise Figure of a Gain-Saturated Erbium-Doped Fiber Amplifier Pumped at 980 nm", *Optical Amplifiers and Their Applications*, 1990 Technical Digest Series, Vol. 13, Conference Edition, Optical Society of America, Aug. 6–8, 1990, Paper TuB3, pp. 134–137, and C. R. Giles, "Propagation of Signal and Noise in Concatenated Erbium-Doped Fiber Optical Amplifiers", *Journal of Lightwave Technology*, Vol. 9, No. 2, February 1991, pp. 147–154.

The noise figure of the fiber amplifier is a parameter that must be considered in such systems to optimize overall system performance. Noise figures of an erbium-doped fiber amplifier pumped at 980 nm have been found to be near 3 dB, which is a desirable performance figure. However, an erbium-doped fiber amplifier pumped at 980 nm does not exhibit an optimal power efficiency for a communication signal distributed at a typical wavelength of about 1550 nm.

In order to provide a higher power efficiency for a 1550 nm communication signal, erbium-doped fiber amplifiers can be pumped at about 1480 nm. However, pumping at this wavelength results in a noise figure of about 5 dB, which is less than optimal.

It would be advantageous to provide a rare earth-doped fiber amplifier, such as an erbium fiber amplifier, that provides both low noise and high power. The present invention provides such an amplifier.

SUMMARY OF THE INVENTION

In accordance with the present invention, a rare earth-doped optical fiber amplifier comprises a length of rare earth-doped fiber. Means are provided for inputting an optical communication signal of a first wavelength to said optical fiber. Means coupled to the fiber pump the fiber at a second wavelength selected to provide a low noise figure. Means coupled to the fiber pump the fiber at a third wavelength selected to provide a high power efficiency. In an illustrated embodiment, the fiber is doped with erbium.

In an erbium-doped fiber amplifier in accordance with the present invention, the second wavelength is advantageously about 980 nm, and the third wavelength is advantageously about 1480 nm. The communication signal can be provided at a first wavelength of about 1550 nm.

The length of erbium-doped fiber has an input end for receiving the communication signal, and an output end for passing the amplified communication signal on to a distribution network or the like. The second wavelength pumping means are coupled to "forward pump" the fiber closer to its input end than to its output end. The third wavelength pumping means are coupled to "backward pump" the fiber closer to its output end than to its input end. In a preferred embodiment, the second wavelength pumping means are coupled adjacent the input end of the doped fiber, and the third wavelength pumping means are coupled adjacent the output end of the doped fiber.

The amplifier can process a plurality of communication signals input as a group. In this event, each communication signal is provided at a different wavelength within an operating range of the amplifier. For an erbium fiber amplifier, the operating range is about 1530 nm to 1570 nm.

A method is provided for improving the noise figure and power efficiency of a rare earth-doped optical fiber amplifier. The fiber amplifier is pumped at a first wavelength selected to provide a low noise figure. The amplifier is simultaneously pumped at a second wavelength selected to provide a high power efficiency.

In a preferred method, the amplifier is an erbium fiber amplifier, the first wavelength is about 980 nm, and the second wavelength is about 1480 nm. A communication signal having a wavelength of about 1550 nm can be input to said amplifier.

In accordance with the method of the present invention, the first pump wavelength is advantageously input to the amplifier closer to an input end thereof than to an output end thereof. The second pump wavelength is advantageously input to the amplifier closer to an output end thereof than to an input end thereof. In a preferred embodiment, the first pump wavelength is input to the amplifier adjacent its input end to forward pump the amplifier, and the second pump wavelength is input to the amplifier adjacent its output end to backward pump the amplifier. A plurality of communication signals can be amplified together, each at a different wavelength within the amplifier's operating range.

BRIEF DESCRIPTION OF THE DRAWING

The FIGURE is a schematic representation of an erbium fiber amplifier in accordance with the present invention.

DETAILED DESCRIPTION OF THE INVENTION

The present invention provides a low noise high power rare earth fiber amplifier suitable for the optical amplification of an AM-VSB composite video signal. Other modulation formats can also be amplified by the amplifier of the present invention, when low noise and high power are desired.

It is well known that the 980 nm pump wavelength for an erbium-doped fiber amplifier produces a lower noise figure than a 1480 nm pump wavelength. This phenomenon has been reported, for example, in the W. I. Way, et al article cited above. On the other hand, the 1480 nm wavelength provides a higher power efficiency in an erbium-doped fiber amplifier operating at a 1550 nm signal wavelength. This is due to the higher quantum efficiency obtained in converting to the 1550 nm wavelength.

The improved power efficiency for a pump wavelength of 1480 nm is evident from the following equations, wherein E is the photon energy, h is Planck's constant, $\nu$ is the frequency associated with a designated wavelength $\lambda$, and C is the speed of light:

$$E_\lambda = h\nu_\lambda$$

$$C = \lambda\nu$$

$$\frac{E_{1550}}{E_{980}} = \frac{980}{1550} = 63\%$$

$$\frac{E_{1150}}{E_{1480}} = \frac{1480}{1150} = 96\%$$

As can be seen, the quantum efficiency of a photon at the 1480 pump wavelength is 96%, whereas the quantum efficiency at the 980 pump wavelength is only 63%. Thus, from the point of view of quantum efficiency, the 1480 nm pump wavelength enjoys a substantial power efficiency improvement in an erbium-doped fiber amplifier.

The present invention takes advantage of the benefits of both the 980 nm and 1480 nm pump wavelengths. In particular, a low noise figure is obtained using a 980 nm pump and high power efficiency is obtained with a 1480 nm pump. As illustrated in the figure, a communication signal to be amplified is input at point 10 to an optical fiber 12 for communication to an optical isolator 14. Fiber 12 and isolator 14 are conventional components, well known in the art. Optical isolator 14 prevents optical reflections, allowing the amplifier to operate in a stable manner.

After the optical isolator the communication signal (typically at a wavelength in a range of about 1530 nm to 1570 nm for an erbium-doped fiber amplifier) is coupled to erbium fiber 20 via a wavelength division multiplexer 16. Multiplexer 16 is a conventional component that efficiently forward couples a 980 nm pump signal from point 18 to the fiber amplifier. Multiplexer 16 can comprise, for example, a dichroic mirror as well known in the art. Such mirrors are designed to reflect light selectively according to wavelength. In the structure illustrated in the figure, such a mirror included in multiplexer 16 would prevent the 980 nm wavelength from exiting the multiplexer in the direction toward optical isolator 14. Thus, the 980 nm wavelength is restricted to the erbium fiber itself.

The length of erbium fiber 20 will be selected according to the fiber doping concentration, and the level of inversion that is necessary for suitable amplifier operation. Techniques for selecting the doped fiber length are well known in the art and can comprise, for example, spectrographic analysis of the fiber or illumination of the fiber with a broadband source at the pump frequencies to determine the fiber emission and absorbtion. Typically, the doped fiber will have a length in the vicinity of about 10-30 meters, and will be configured in a coil to save space. Those skilled in the art will appreciate that it is possible to design fiber amplifiers with even shorter or longer lengths.

Doped fiber 20 has an input end coupled to receive the input signal and 980 nm wavelength pump signal from multiplexer 16. An output end of fiber 20 is coupled to a wavelength division multiplexer 22, that is substantially identical to wavelength division multiplexer 16, except it is designed to efficiently backward couple a 1480 nm pump wavelength from point 24 to the erbium fiber 20. Multiplexer 22 selectively passes the 1550 nm signal wavelength to a conventional optical isolator 26, which isolates the amplified signal for output to an optical communication network or the like.

The present invention provides an erbium fiber amplifier having the advantages of each of the 980 nm and 1480 nm pump wavelengths. The noise figure of the amplifier is primarily determined by the 980 nm pump wavelength input at the first end of the doped fiber. The amplifier output power is primarily determined by the 1480 nm pump wavelength input at the output end of the doped fiber. Thus, the traveling wave erbium fiber amplifier illustrated operates like a two-stage amplifier, although there is an overlapping of the stages.

It should now be appreciated that the present invention provides an optical fiber amplifier having low noise and high power efficiency. A rare earth-doped fiber is forward pumped adjacent its signal input end at a wavelength selected to provide a low noise figure. The fiber is backward pumped adjacent its output end at a wavelength selected to provide a high power efficiency. Although an erbium fiber is illustrated in the preferred embodiment, those skilled in the art will appreciate that other three-level laser systems can be substituted. Those skilled in the art will appreciate that numerous other modifications and adaptations may be made to the structure disclosed herein without departing from the spirit and scope of the invention, as set forth in the claims.

What is claimed is:

1. A rare earth doped optical fiber amplifier for use in optical communication systems comprising:
   a length of optical fiber doped with a rare earth element, said fiber having an input end and an output end;

means for inputting an optical communication signal of a first wavelength to the input end of said fiber;

means coupled closer to the input end of said fiber than to the output end thereof for pumping said fiber at a second wavelength selected to directly excite said rare earth element to provide a low noise figure; and means coupled closer to the output end of said fiber than to the input end thereof for pumping said fiber at a third wavelength that is longer than said second wavelength and is selected to directly excite said rare earth element to provide a high power efficiency.

2. A fiber amplifier in accordance with claim 1 wherein said fiber is doped with a rare earth element which has a three-level laser system.

3. A fiber amplifier in accordance with claim 2 wherein said rare earth element is erbium.

4. A fiber amplifier in accordance with claim 3 wherein said second wavelength is about 980 nm and said third wavelength is about 1480 nm.

5. A fiber amplifier in accordance with claim 4 wherein said first wavelength is in a range of about 1530 nm to 1570 nm.

6. A fiber amplifier in accordance with claim 4 wherein said second wavelength pumping means are coupled adjacent said input end and said third wavelength pumping means are coupled adjacent said output end.

7. A fiber amplifier in accordance with claim 6 wherein said inputting means input a plurality of optical communication signals to said fiber at respective wavelengths within a range of about 1530 nm to 1570 nm.

8. A fiber amplifier in accordance with claim 1 wherein said second wavelength pumping means are coupled adjacent said input end and said third wavelength pumping means are coupled adjacent said output end.

9. A fiber amplifier in accordance with claim 1 wherein said inputting means input a plurality of optical communication signals to said fiber at respective wavelengths within an operating range of said amplifier.

10. A method of improving the noise figure and power efficiency of an optical fiber amplifier doped with a rare earth element for use in an optical communication system, comprising the steps of:

pumping said fiber amplifier closer to an input end thereof than to an output end thereof at a first wavelength selected to directly excite said rare earth element to provide a low noise figure; and simultaneously pumping said amplifier closer to said output end thereof than to said input end thereof at a second wavelength that is longer than said first wavelength and is selected to directly excite said rare earth element to provide a high power efficiency.

11. A method in accordance with claim 10 wherein:
said amplifier is an erbium fiber amplifier;
said first wavelength is about 980 nm; and
said second wavelength is about 1480 nm.

12. A method in accordance with claim 11 comprising the further step of:
inputting a communication signal having a wavelength within a range of about 1530 nm to 1570 nm to said amplifier.

13. A method in accordance with claim 11 wherein:
said first pump wavelength is input to said amplifier adjacent to said input end; and
said second pump wavelength is input to said amplifier adjacent to said output end.

14. A method in accordance with claim 13 comprising the further step of:
inputting a plurality of communication signals having respective wavelengths within a range of about 1530 nm to 1570 nm to said erbium fiber amplifier.

15. A method in accordance with claim 12 wherein:
said first pump wavelength is input to said amplifier adjacent to said input end; and
said second pump wavelength is input to said amplifier adjacent to said output end.

16. A method in accordance with claim 10 comprising the further step of:
inputting a plurality of communication signals to said amplifier having respective wavelengths within an operating range of the amplifier.

* * * * *